United States Patent
Yin

(10) Patent No.: US 8,398,055 B2
(45) Date of Patent: Mar. 19, 2013

(54) BALL SEGMENT VALVE

(75) Inventor: Chih-Chien Yin, Chiayi County (TW)

(73) Assignee: J-Flow Controls, LLC, Cincinnati, OH (US)

( * ) Notice: Subject to any disclaimer, the term of this patent is extended or adjusted under 35 U.S.C. 154(b) by 127 days.

(21) Appl. No.: 13/104,242

(22) Filed: May 10, 2011

(65) Prior Publication Data
US 2012/0168661 A1 Jul. 5, 2012

(30) Foreign Application Priority Data

Dec. 29, 2010 (TW) .............................. 99146565 A

(51) Int. Cl.
*F16K 5/06* (2006.01)

(52) U.S. Cl. ............. 251/214; 251/315.08; 251/315.14; 251/315.16

(58) Field of Classification Search .................. 251/214, 251/315.01–315.16
See application file for complete search history.

(56) References Cited

U.S. PATENT DOCUMENTS

| | | | | | |
|---|---|---|---|---|---|
| 3,109,623 | A | * | 11/1963 | Bryant | 251/315.08 |
| 4,217,923 | A | * | 8/1980 | Kindersley | 251/214 |
| 4,428,561 | A | * | 1/1984 | Thompson | 251/315.08 |
| 4,519,412 | A | * | 5/1985 | Grazioli | 251/214 |
| 4,634,098 | A | * | 1/1987 | Varden | 251/315.08 |
| 4,911,408 | A | * | 3/1990 | Kemp | 251/214 |
| 4,989,833 | A | | 2/1991 | Polon | |
| 5,186,433 | A | * | 2/1993 | Pausch | 251/309 |
| 5,755,427 | A | * | 5/1998 | Koskinas | 251/188 |
| 5,820,103 | A | | 10/1998 | Nilsson et al. | |
| 6,076,831 | A | * | 6/2000 | Pfannenschmidt | 251/214 |
| 6,202,668 | B1 | * | 3/2001 | Maki | 251/214 |
| 6,378,842 | B1 | * | 4/2002 | Frese et al. | 251/315.16 |
| 2001/0045231 | A1 | * | 11/2001 | Monod | 251/315.13 |
| 2008/0093574 | A1 | * | 4/2008 | Ohta | 251/315.1 |

FOREIGN PATENT DOCUMENTS

WO 2005/040655 5/2005

* cited by examiner

*Primary Examiner* — John Bastianelli
(74) *Attorney, Agent, or Firm* — Faegre Baker Daniels LLP

(57) ABSTRACT

A ball segment valve for controlling fluid flow in a piping, includes a valve housing with a valve seat disposed therein, a tubular bearing body fitted to an upper axial opening of the valve housing, a rotating spindle inserted through the bearing body into the valve housing, a tightening sleeve unit sleeved on the spindle to ensure full engagement of the spindle with the bearing body, a journal member inserted through a lower axial opening into the valve housing, and a valve body having upper and lower lugs coaxially fitted to the spindle and the journal member, and a spherical segment having a convex outer spherical surface and rotated with the spindle between a fully closed position, where the spherical surface is in sealing contact with the valve seat, and a fully opened position to permit a full fluid communication of the valve housing.

9 Claims, 5 Drawing Sheets

BALL SEGMENT VALVE

BACKGROUND OF THE INVENTION

1. Field of the Invention

This invention relates to a ball valve, more particularly to a ball segment valve.

2. Description of the Related Art

In many chemical industrial and manufacturing applications, ball valves are commonly used to regulate fluid flow in pipes. However, when a fluid containing solid particles, such as plant fibers, glass fibers, carbon fibers, etc., passes through a ball valve in a pipe, the solid particles may be trapped between a ball and a sealing assembly of the ball valve to obstruct the closing thereof. Additionally, due to high frictional resistance generated by the solid particles in the fluid, a relatively high mechanical effort to move the ball valve between closed and opened states is required so as to raise consumed power, particularly when the ball valve is actuated by a servo motor.

In view of the aforesaid problem, a ball segment valve, such as that disclosed in U.S. Pat. Nos. 5,820,103, 4,989,833, or WO 2005/040655 A1, has been proposed in which a partial segment of a full ball is provided so as to prevent obstruction of the closing of the valve. However, when the ball segment valve is in a fully closed position, a spindle that rotates the ball segment is subjected to a relatively large pressure of the fluid flow, which may adversely affect maintenance operation of the valve. Specifically, a sealing assembly provided to seal engagement between the spindle and a valve body of the ball segment valve may easily become worn due to a repeated rotation of the spindle relative to the sealing assembly, and has to be replaced regularly. Since the fluid pressure in the pipe may need to be lowered before replacing the sealing assembly, the overall fluid flow may have to be reduced, thereby adversely affecting subsequent operations, such as a reduction in paper pulp supply, in a paper manufacturing process.

SUMMARY OF THE INVENTION

An object of the present invention is to provide a ball segment valve which can be easily assembled and disassembled to facilitate maintenances thereof.

According to this invention, the ball segment valve includes a valve housing having two flow openings opposite to each other along a centerline, a flow duct disposed between the flow openings, and upper and lower axial openings disposed opposite to each other along a rotating axis that intersects the centerline, and in communication with the flow duct. An annular valve seat is disposed in the valve housing to surround the centerline, and between the flow duct and one of the flow openings to control fluid communication therebetween. A tubular bearing body has a bushing segment which is configured to be fittingly inserted into the upper axial opening, which defines a bushing bore in communication with the flow duct, and which extends axially and toward the flow duct to terminate at a lower bushing end, and a bearing segment axially opposite to the bushing segment. A rotating spindle has coupling and actuated segments opposite to each other along a spindle axis, and a spindle segment which is configured to be insertable through the bushing bore so as to allow for the coupling segment to extend into the flow duct with the spindle axis oriented in line with the rotating axis. A tightening sleeve unit is disposed to sleeve on the spindle segment, and has pressed and pressing sleeve ends opposite to each other axially such that when a tightening force is applied to the pressed sleeve end, the pressing sleeve end is forced to urge the lower bushing end toward the coupling segment so as to ensure locating the coupling segment in a fully engaging position. A journal member has a journal portion which is inserted into the flow duct from the lower axial opening and which extends along a journal axis that is oriented in line with the rotating axis. A valve body has upper and lower lugs which are configured to be respectively and coaxially fitted to the coupling segment and the journal portion, and a spherical segment having a convex outer spherical surface which defines a center of sphere that is located at the intersection of the rotating axis and the centerline. The spherical segment is rotatable with the upper and lower lugs about the rotating axis between a fully closed position, where a spherical apex of the outer spherical surface is located at the centerline, and where the outer spherical surface is in sealing contact with an entire circumference of the valve seat so as to interrupt fluid communication between the flow duct and the flow opening, and a fully opened position, where the spherical apex of the outer spherical surface is at an angle from the centerline to permit full fluid communication between the flow opening and the flow duct. A spline assembly is disposed between the upper lug and the coupling segment to axially guide the coupling segment to the fully engaging position where a torque exerted on the actuated segment is transmitted through the spline assembly to rotate the valve body about the rotating axis.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
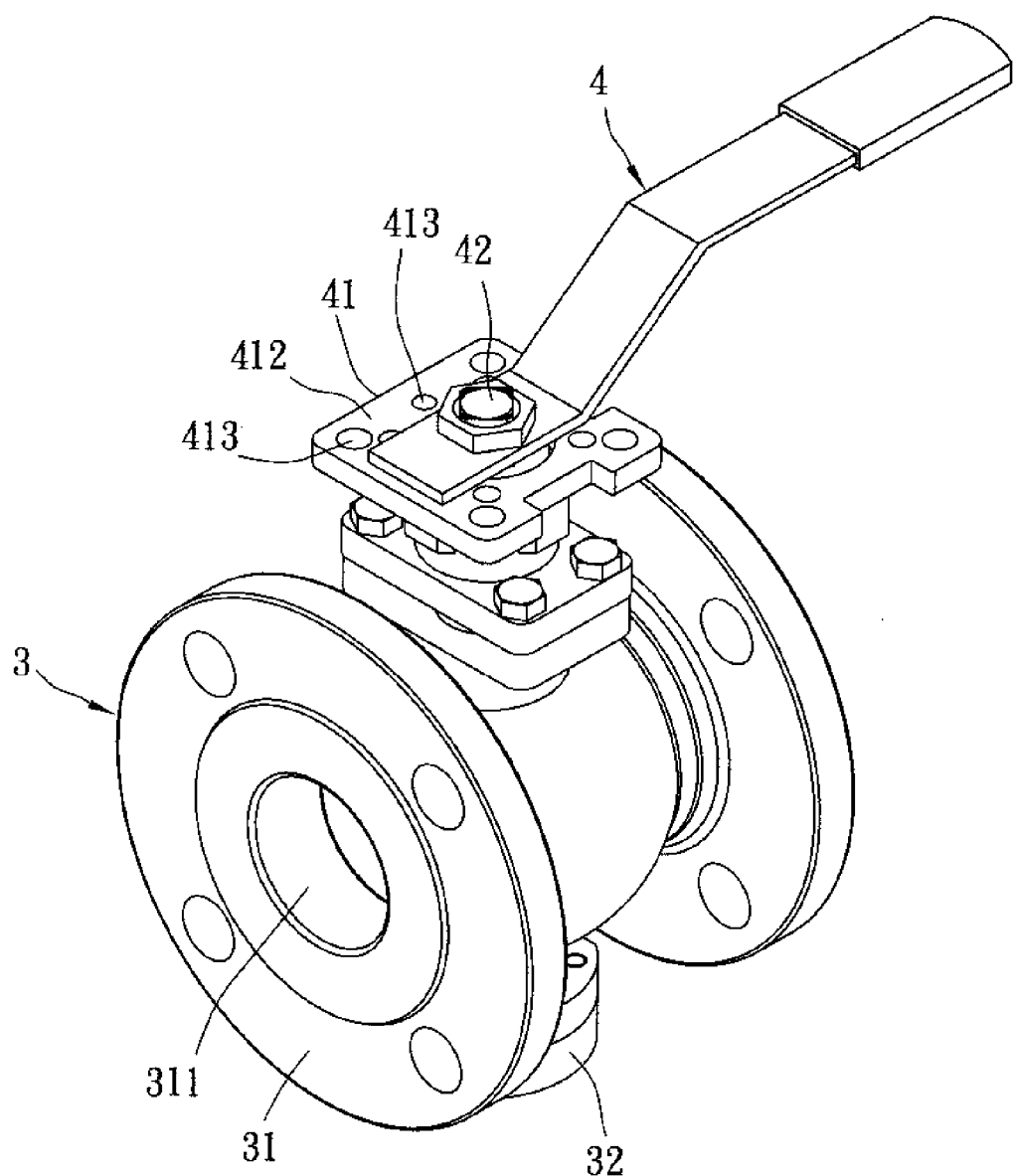
FIG. 1 is a perspective view of the preferred embodiment of a ball segment valve according to this invention.
Figure 2:
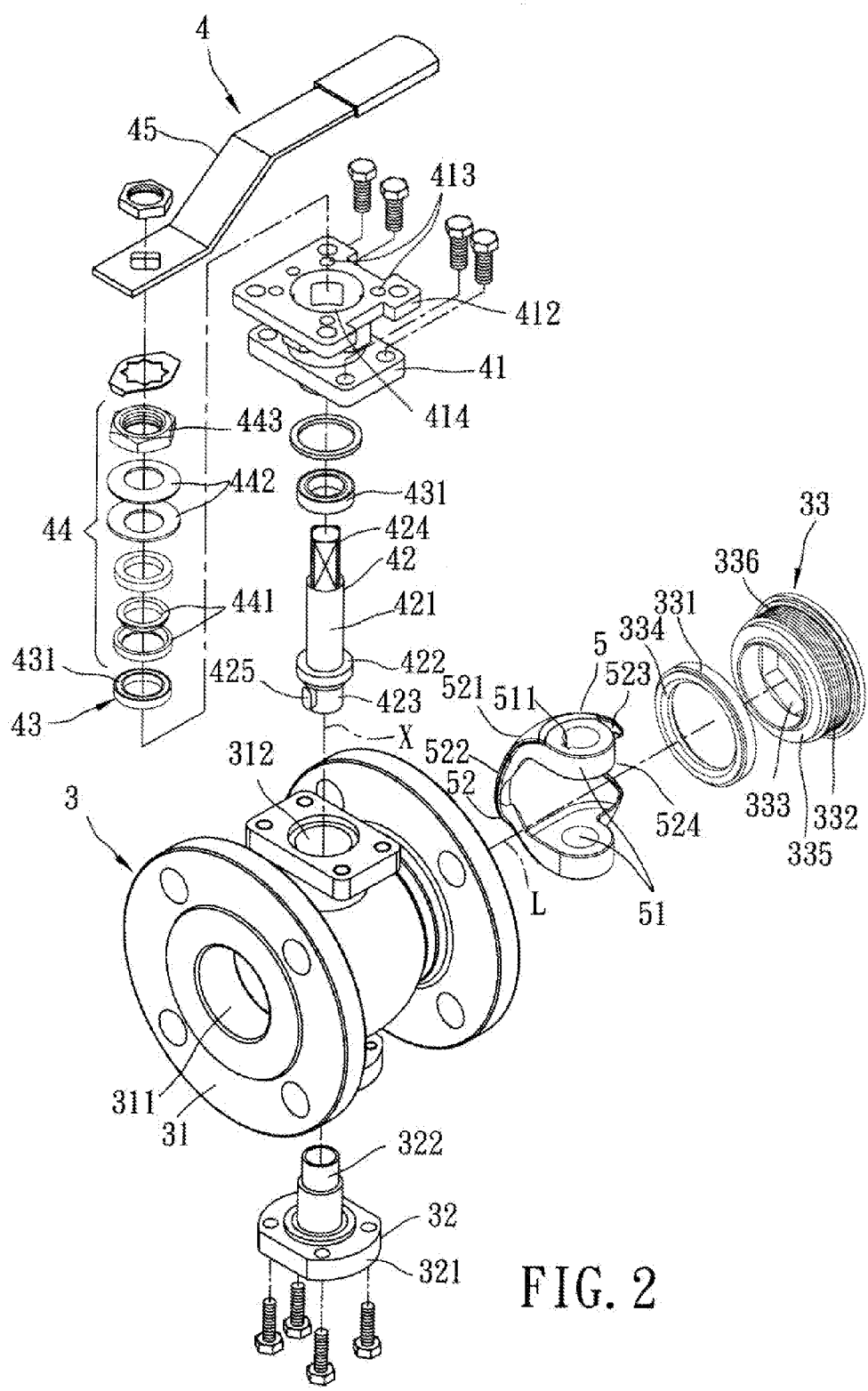
FIG. 2 is an exploded perspective view of the preferred embodiment.
Figure 3:
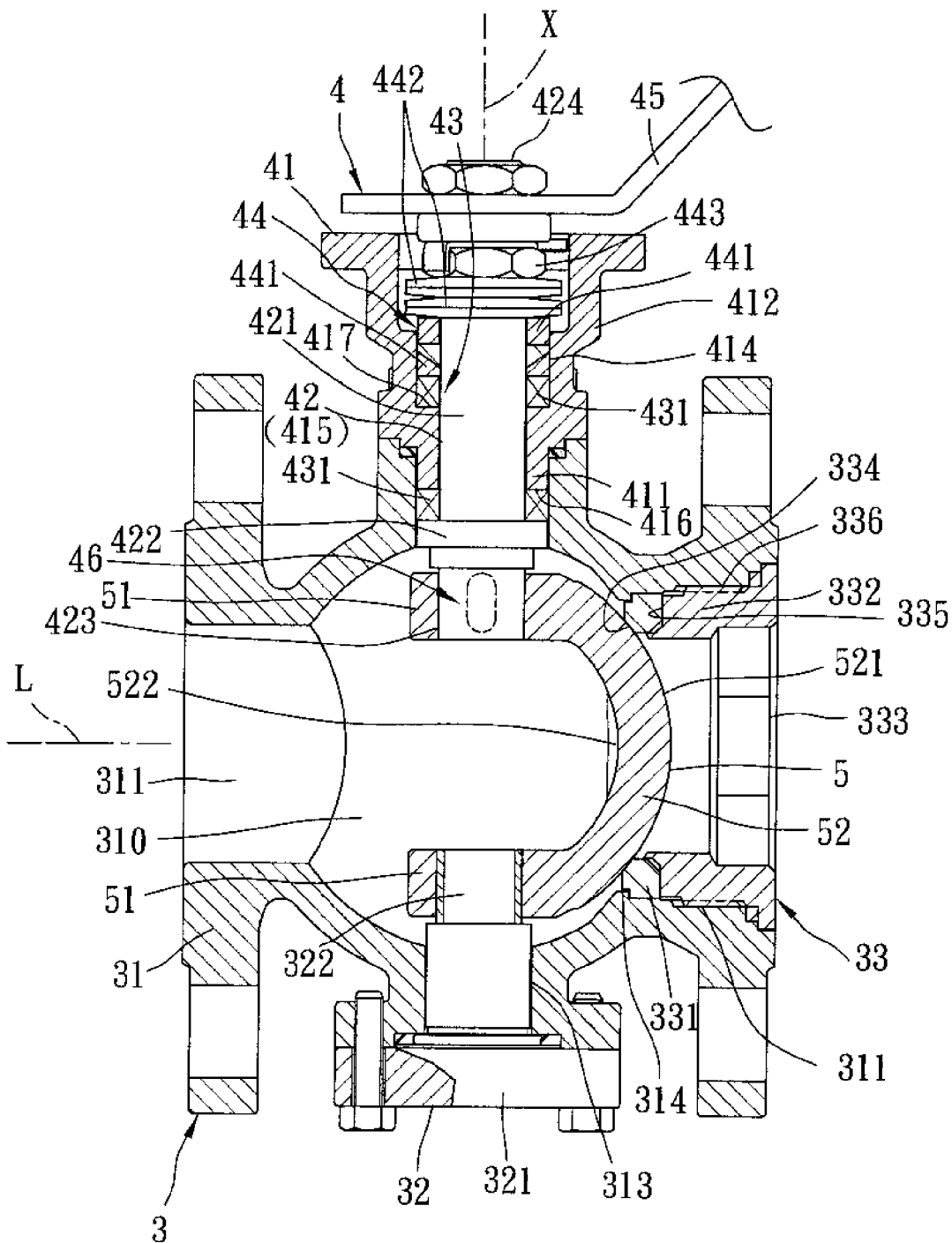
FIG. 3 is a sectional view of the preferred embodiment in a fully closed position.

Referring to FIGS. 1 to 3, the preferred embodiment of a ball segment valve according to the present invention is adapted to be mounted in a pipe (not shown) for regulating the fluid flow in the pipe. Such fluid may contain solid particles, such as plant fibers, glass fibers, carbon fibers, etc.

The ball segment valve of this embodiment is shown to comprise a valve chamber unit 3, a driving mechanism 4, and a valve body 5.

The valve chamber unit 3 includes a valve housing 31, a journal member 32, and a seal assembly 33. The valve housing 31 has an inner housing surface which surrounds a centerline (L) to define left and right flow openings 311 opposite to each other, and a flow duct 310 disposed between the left and right flow openings 311. The valve housing 31 further 1 is upper and lower axial openings 312, 313 disposed opposite to each other along a rotating axis (X) that intersects the centerline (L), and in communication with the flow duct 310, and an annular barrier 314 which is disposed on the inner housing surface and adjacent to the right flow opening 311. The journal member 32 includes a cover portion 321 which is configured to be detachably secured to a bottom side of the valve housing 31 so as to cover the lower axial opening 313, and a journal portion 322 which is inserted into the flow duct 310 from the lower axial opening 313 and which extends along a journal axis that is oriented in line with the rotating axis (X). The seal assembly 33 includes an annular seal member 331, and an annular adaptor member 332. The annular seal member 331 is made from a metal material, and is disposed in the right flow opening 311. The annular seal member 331 has an annular surface 334 which surrounds the centerline (L) and which confronts the flow duct 310 to serve as an annular valve seat 334. The annular adaptor member 332 has an annular abutment end 335 which is abuttingly engageable with the annular seal member 331, and an externally threaded segment 336 which is threadedly engaged with the inner housing surface so as to bring the annular abutment end 335 into abutting engagement with the annular seal member 331 by virtue of a screw-in action against the annular barrier 314. The annular adaptor member 332 further has a non-circular socket portion 333 for fitting and non-rotatable insertion of a piping (not shown) thereinto.

The driving mechanism 4 includes a tubular bearing body 41, a rotating spindle 42, a tightening sleeve unit 44, a bearing assembly 43, and an adjusting lever 45.

The tubular bearing body 41 has a bushing segment 411 which is configured to be fittingly inserted into the upper axial opening 312, which defines a bushing bore 415 in communication with the flow duct 310, and which extends axially and toward the flow duct 310 to terminate at a lower bushing end 416, and a bearing segment 412 which is axially opposite to the bushing segment 411, and which defines a bearing hole 414 of a larger dimension than the bushing bore 415 to form a shoulder abutment surface 417 therebetween. A plurality of screw holes 413 are formed in a top side of the bearing segment 412 for mounting a power device (not shown) to actuate rotation of the rotating spindle 42.

The rotating spindle 42 has coupling and actuated segments 423, 424 opposite to each other along a spindle axis, a spindle segment 421 which is disposed between the coupling and actuated segments 423, 424, and which is configured to be insertable through the bushing bore 415 so as to allow for the coupling segment 423 to extend into the flow duct 310 with the spindle axis oriented in line with the rotating axis (X), and an annular flange 422 which is disposed between the spindle segment 421 and the coupling segment 423, and which is configured to be fit in the upper axial opening 312 to confront, and to be rotatable relative to the lower bushing end 416 about the rotating axis (X) so as to ensure the spindle axis of the rotating spindle 42 to be in line with the rotating axis (X).

The tightening sleeve unit 44 is air-tightly sleeved on the spindle segment 421, and includes a plurality of air-tight shims 441 to serve as a pressing sleeve end 441, two spring washers 442, and a screw nut 443 to serve as a pressed sleeve end 443 opposite to the pressed sleeve end 441 axially. When a tightening force is applied to the pressed sleeve end 443, the pressing sleeve end 441 is forced to urge the lower bushing end 416 toward the annular flange 422 so as to ensure locating the coupling segment 423 in a fully engaging position, so as to prevent fluid in the flow duct 310 from leakage through the upper axial opening 312 and the tubular bearing body 41.

The bearing assembly 43 includes a first anti-friction bearing 431 disposed in the bearing hole 414 between the pressing sleeve end 441 and the shoulder abutment surface 417, and a second anti-friction bearing 431 disposed in the upper axial opening 312 between the lower bushing end 416 and the annular flange 422.

The adjusting lever 45 is coupled to the actuated segment 424 so as to apply a torque thereto.

Figure 4:
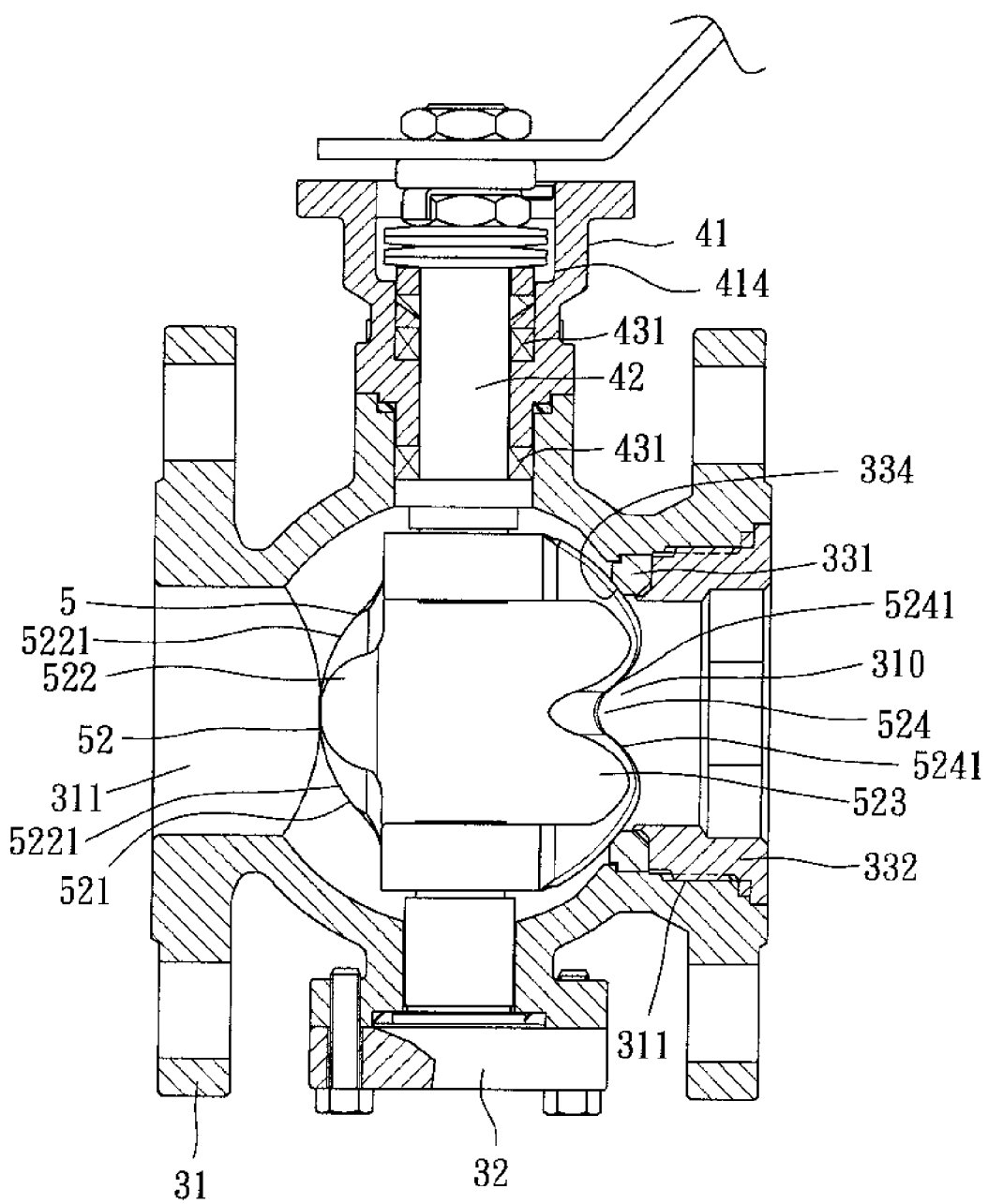
FIG. 4 is a sectional view of the preferred embodiment in a fully opened position.

Referring to FIGS. 2 to 4, the valve body 5 has upper and lower lugs 51 which are configured to be respectively and coaxially fitted to the coupling segment 423 and the journal portion 322, and a spherical segment 52 which is interposed between the upper and lower lugs 51. Specifically, the upper lug 51 is in a spline engagement with the coupling segment 423 by means of a spline assembly 46 that includes an axially extending key 425 and an axially extending key slot 511 respectively disposed on the coupling segment 423 and in the upper lug 51 and matingly fitted to each other. Thus, the coupling segment 423 can be axially guided to the fully engaging position where the torque exerted on the actuated segment 424 is transmitted through the spline assembly 46 to rotate the valve body 5 about the rotating axis (X).

The spherical segment 52 of the valve body 5 has a convex outer spherical surface 521 which defines a center of sphere that is located at the intersection of the rotating axis (X) and the centerline (L). The spherical segment 52 is rotatable with the upper and lower lugs 51 about the rotating axis (X) between a fully closed position, as shown in FIG. 3, where a spherical apex of the outer spherical surface 521 is located at the centerline (L), and where the outer spherical surface 521 is in sealing contact with an entire circumference of the valve seat 334 so as to interrupt fluid communication between the flow duct 310 and the right flow opening 311, and a fully opened position, as shown in FIG. 4, where the spherical apex of the outer spherical surface 521 is at 90 degree from the centerline (L) to permit full fluid communication between the right flow opening 311 and the flow duct 310.

Figure 5:
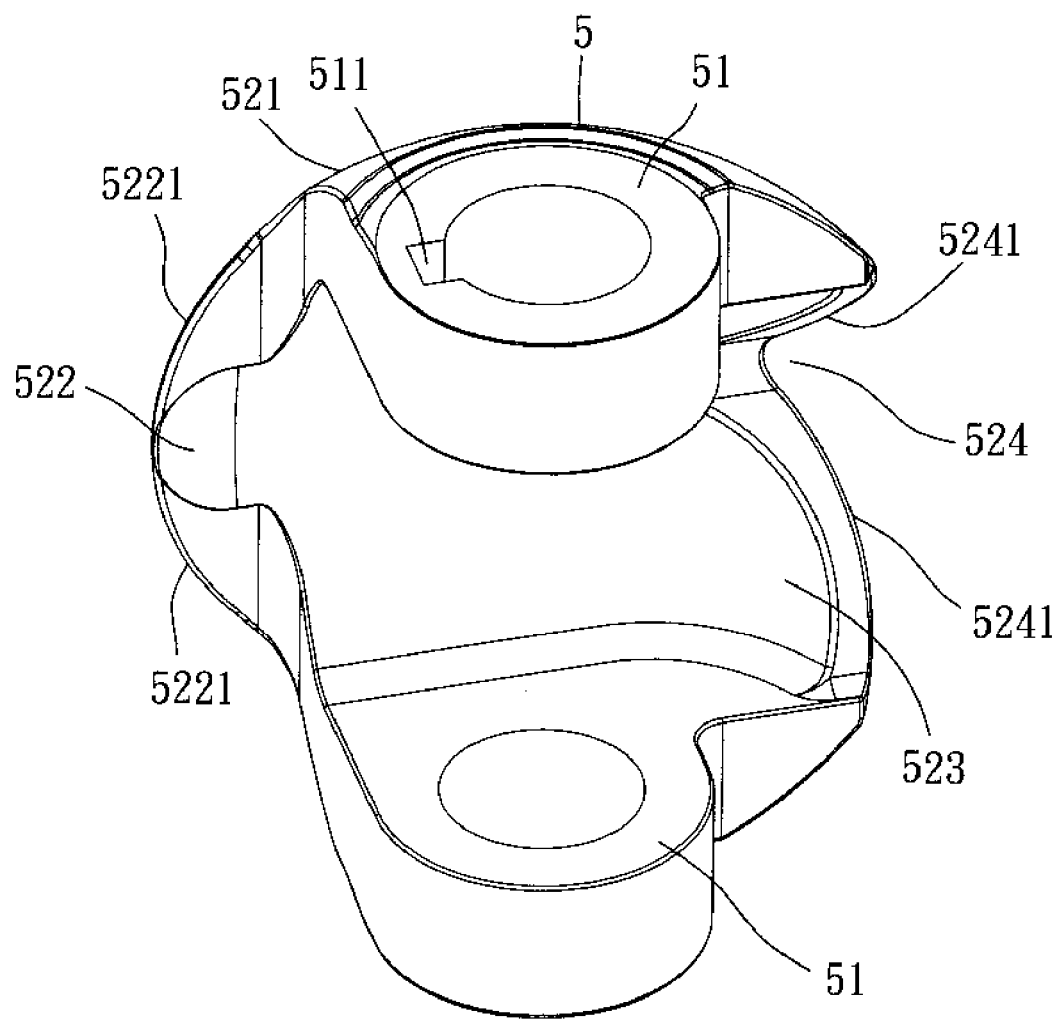
FIG. 5 is a perspective view of a valve body of the preferred embodiment.

Specifically, referring to FIGS. 3 to 5, the outer spherical surface 521 of the spherical segment 52 is configured to form leading and trailing regions 522, 523 which are spaced apart from each other in a transverse direction that is transverse to both the centerline (L) and the rotating axis (X). The leading region 522 has a tapered contour which includes upper and lower contour segments 5221 that respectively extend convergently from the upper and lower lugs 51 and away from the spherical apex. The trailing region 523 has a cutout area 524 defined by upper and lower marginal segments 5241 which extend convergently toward the spherical apex.

In assembly, the valve body 5 is mounted in the flow duct 310 and is coaxially fitted to the coupling segment 423 and the journal portion 322 so as to locate the center of sphere at the intersection of the rotating axis (X) and the centerline (L). Also, the tightening sleeve unit 44 is received in the bearing hole 414 from the top side of the tubular bearing body 41, and is tightened with the tubular bearing body 41 to ensure fluid-tight engagement of the rotating spindle 42 with the tubular bearing body 41. Thus, once it is desired to replace the tightening sleeve unit 44, the tightening sleeve unit 44 can be removed from the tubular bearing body 41 without the need to detach the tubular bearing body 41 and the rotating spindle 42.

Further, during rotation of the valve body 5 from the fully opened position to the fully closed position by actuating the adjusting lever 45 in either a clockwise direction or a counterclockwise direction, with the configuration of the leading and trailing regions 522, 523, the area of the right flow opening 311 through which fluid may pass is decreased gradually so that the flow mass as well as the fluid pressure in the flow duct 310 is gradually decreased. Hence, since a lateral force to which the rotating spindle 42 is subjected by the fluid flow is varied gradually, and since the bearings 431 are disposed between the rotating spindle 42 and the valve housing 31, and between the rotating spindle 42 and the tubular bearing body 41, the rotating spindle 42 can be rotated smoothly such that the torque required to rotate the rotating spindle 42 can be relatively smaller and can be applied via a servomotor (not shown) for automatic control.

Similarly, during rotation of the valve body 5 from the fully closed position to the fully opened position to move either the leading region 522 or the trailing region 523 toward the right flow opening 311, the flow mass of fluid through the right flow opening 311 is gradually increased, thereby resulting in gradual increment of the lateral pressure to which the rotating spindle 42 is subjected.

Additionally, during turn-off of the ball segment valve, solid particles in the fluid can be removed by means of slidable engagement between the annular valve seat 334 and a respective one of the leading region 522 and the marginal segments 5241 so as to avoid trapping therebetween.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A ball segment valve comprising:
    a valve housing having two flow openings opposite to each other along a centerline, a flow duct disposed between said flow openings, and upper and lower axial openings disposed opposite to each other along a rotating axis that intersects the centerline, and in communication with said flow duct;
    an annular valve seat disposed in said valve housing to surround the centerline, and between said flow duct and one of said flow openings to control fluid communication therebetween;
    a tubular bearing body having a bushing segment which is configured to be fittingly inserted into said upper axial opening, which defines a bushing bore in communication with said flow duct, and which extends axially and toward said flow duct to terminate at a lower bushing end, and a bearing segment axially opposite to said bushing segment;
    a rotating spindle which has coupling and actuated segments opposite to each other along a spindle axis, and a spindle segment which is disposed between said coupling and actuated segments, and which is configured to be insertable through said bushing bore so as to allow for said coupling segment to extend into said flow duct with the spindle axis oriented in line with the rotating axis;
    a tightening sleeve unit which is disposed to sleeve on said spindle segment, and which has pressed and pressing sleeve ends opposite to each other axially, said tightening sleeve unit being configured such that when a tightening force is applied to said pressed sleeve end, said pressing sleeve end is forced to urge said lower bushing end toward said coupling segment so as to ensure locating said coupling segment in a fully engaging position;
    a journal member having a journal portion which is inserted into said flow duct from said lower axial opening and which extends along a journal axis that is oriented in line with the rotating axis;
    a valve body having upper and lower lugs which are configured to be respectively and coaxially fitted to said coupling segment and said journal portion, and a spherical segment which is interposed between said upper and lower lugs, said spherical segment having a convex outer spherical surface which defines a center of sphere that is located at the intersection of the rotating axis and the centerline, said spherical segment being rotatable with said upper and lower lugs about the rotating axis between a fully closed position, where a spherical apex of said outer spherical surface is located at the centerline, and where said outer spherical surface is in sealing contact with an entire circumference of said valve seat so as to interrupt fluid communication between said flow duct and said flow opening, and a fully opened position, where the spherical apex of said outer spherical surface is at an angle from the centerline to permit full fluid communication between said flow opening and said flow duct; and
    a spline assembly which is disposed between said upper lug and said coupling segment to axially guide said coupling segment to the fully engaging position where a torque exerted on said actuated segment is transmitted through said spline assembly to rotate said valve body about the rotating axis.

2. The ball segment valve according to claim 1, wherein said bearing segment defines a bearing hole of a larger dimension than said bushing bore to form a shoulder abutment surface therebetween, said rotating spindle further having an annular flange which is disposed between said spindle segment and said coupling segment, and which is configured to be fit in said upper axial opening to confront, and to be rotatable relative to said lower bushing end about the rotating axis so as to ensure the spindle axis of said rotating spindle to be in line with the rotating axis.

3. The ball segment valve according to claim 2, further comprising a first anti-friction bearing disposed in said bearing hole between said pressing sleeve end and said shoulder abutment surface, and a second anti-friction bearing disposed in said upper axial opening between said lower bushing end and said annular flange.

4. The ball segment valve according to claim 1, wherein said spline assembly includes an axially extending key and an axially extending key slot which are respectively disposed on said coupling segment and in said upper lug and which are matingly fitted to each other.

5. The ball segment valve according to claim 1, wherein said outer spherical surface of said spherical segment is configured to form leading and trailing regions which are spaced apart from each other in a transverse direction that is transverse to both the centerline and the rotating axis, said leading region having a tapered contour which includes upper and lower contour segments that respectively extend convergently from said upper and lower lugs and away from the spherical apex, said trailing region having a cutout area defined by upper and lower marginal segments which extend convergently toward the spherical apex.

6. The ball segment valve according to claim 1, wherein said valve housing has an inner housing surface which surrounds the centerline to define said flow openings, said ball segment valve further comprising an annular seal member disposed in said one of said flow openings and having an annular surface which confronts said flow duct to serve as said annular valve seat, and an annular adaptor member which has annular abutment end that is abuttingly engageable with said annular seal member, and an externally threaded segment that is threadedly engaged with said inner housing surface so as to bring said annular abutment end into abutting engagement with said annular seal member by virtue of a screw-in action.

7. The ball segment valve according to claim 6, wherein said valve housing has an annular barrier which is disposed on said inner housing surface, and which is configured to counteract said annular seal member against the screw-inaction of said externally threaded segment.

8. The ball segment valve according to claim 7, wherein said journal member further includes a cover portion configured to be detachably secured to said valve housing so as to cover said lower axial opening once said journal portion is inserted into said flow duct through said lower axial opening.

9. The ball segment valve according to claim 1, further comprising an adjusting lever coupled to said actuated segment so as to apply the torque thereto.

* * * * *